(12) United States Patent  
Whitmore, Sr.

(10) Patent No.: US 8,313,701 B2
(45) Date of Patent: Nov. 20, 2012

(54) LIQUID VACUUM CHEMICAL FEEDER SYSTEM

(76) Inventor: Brian S. Whitmore, Sr., Spring, TX (US)

( * ) Notice: Subject to any disclaimer, the term of this patent is extended or adjusted under 35 U.S.C. 154(b) by 185 days.

(21) Appl. No.: 12/857,274

(22) Filed: Aug. 16, 2010

(65) Prior Publication Data

US 2011/0023968 A1 Feb. 3, 2011

Related U.S. Application Data

(63) Continuation-in-part of application No. 11/472,886, filed on Jun. 22, 2006, now Pat. No. 7,776,275.

(60) Provisional application No. 60/693,174, filed on Jun. 23, 2005.

(51) Int. Cl.
*G05D 7/00* (2006.01)

(52) U.S. Cl. .......... 422/110; 422/108; 422/111; 137/10; 137/101.19

(58) Field of Classification Search .................. 422/108, 422/110, 111; 137/10, 101.19
See application file for complete search history.

(56) References Cited

U.S. PATENT DOCUMENTS 6,263,900 B1 * 7/2001 Cabrera et al. ................ 137/113

* cited by examiner

*Primary Examiner* — Walter D Griffin
*Assistant Examiner* — Lessanework Seifu
(74) *Attorney, Agent, or Firm* — Winstead PC; Henry L. "Bud" Ehrlich

(57) ABSTRACT

A device and method for continuously controlling the flow rate of an aqueous chemical drawn into a flowing fluid stock includes a metering assembly drawing the aqueous chemical into the inlet of a metering assembly through a flow rate sensor and then through a metering device and into the flowing fluid stock. The flow sensor is monitored and an electronic controller can adjusts the flow rate of the aqueous chemical through the metering device in response to monitoring the flow rate sensor. An electronic controller can also change the direction of the flow of the aqueous chemical into the flowing fluid stock through one ejector to another ejector in response to monitoring at the metering assembly.

20 Claims, 5 Drawing Sheets

LIQUID VACUUM CHEMICAL FEEDER SYSTEM

RELATED APPLICATIONS

This application is a continuation-in-part of application Ser. No. 11/472,886, filed Jun. 22, 2006, now U.S. Pat. No. 7,776,275, issued on Aug. 17, 2010, which is a non-provisional application of provisional application Ser. No. 60/693,174, filed on Jun. 23, 2005.

BACKGROUND

Various systems for feeding aqueous chemicals under a vacuum exist. Commonly, these prior art systems utilize a venturi to create a vacuum. The vacuum draws a neat chemical through a calibrated glass tube and V-notch. The glass tube is utilized as an indication tool, wherein the V-notch is aligned with the calibration marks to control the flow rate through the metering device.

There are numerous drawbacks to these contemporary vacuum feeder systems relating to accuracy, operation and control. One drawback is that the calibration is determined for specific chemicals and their properties at standard conditions. Thus, if the chemical properties vary from those related to the calibration points the metered rate will be inaccurate, and these glass tube, V-notch devices will not indicate the inaccuracy. For example, changes in the chemical's specific gravity from that utilized for the calibration can result in significant metering inaccuracy.

Another drawback is when unstable chemicals, such as sodium hypochlorite for example, have gas breakout. The gas can become trapped in the V-notch device preventing proper operation of the metering device. Similar problems exist when debris or precipitates clog the ejector, or entrained gasses exist in the chemical feed stream. Again, the failure of the metering device will often go unnoticed until an operator visually checks the glass tube or a failure downstream in the fluid treatment system is noted.

Another drawback of the contemporary vacuum metering systems is the requirement for vacuum regulation systems. As the differential suction head changes, e.g. as the chemical level in the storage tank changes, chemical flow rate will change unless the differential head is addressed.

SUMMARY

An embodiment of a chemical feeder system for administering a desired concentration of a treating chemical to a flowing fluid stock comprises an aqueous chemical contained in a chemical source; a first ejector fluidicly connected with the flowing fluid stock; a second ejector fluidicly connected with the flowing fluid stock; a metering assembly comprising a flow rate sensor and a metering device interconnected to form a chemical flow path between a chemical inlet and a metered chemical outlet, the flow rate sensor positioned upstream of the metering device in the chemical flow path; a metered chemical conduit extending from the metering assembly to the first ejector and the second ejector; and an ejector switchover operationally connected within the metered chemical conduit to selectively route the flow of the aqueous chemical from the metered chemical conduit to one of the first ejector and the second ejector.

An embodiment of a method for continuously controlling the flow rate of an aqueous chemical drawn into a flowing fluid stock comprises providing a metering assembly comprising a flow rate sensor and a metering device forming a flow path between an inlet and a metered chemical outlet; drawing the aqueous chemical into the inlet of the metering assembly through the flow rate sensor and then the metering device and into the flowing fluid stock; monitoring the flow sensor; adjusting, via an electronic controller, the flow rate of the aqueous chemical through the metering device in response to monitoring the flow rate sensor; and directing, via the electronic controller, the flow of the aqueous chemical into the flowing fluid stock through one of a first ejector and a second ejector.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The present disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
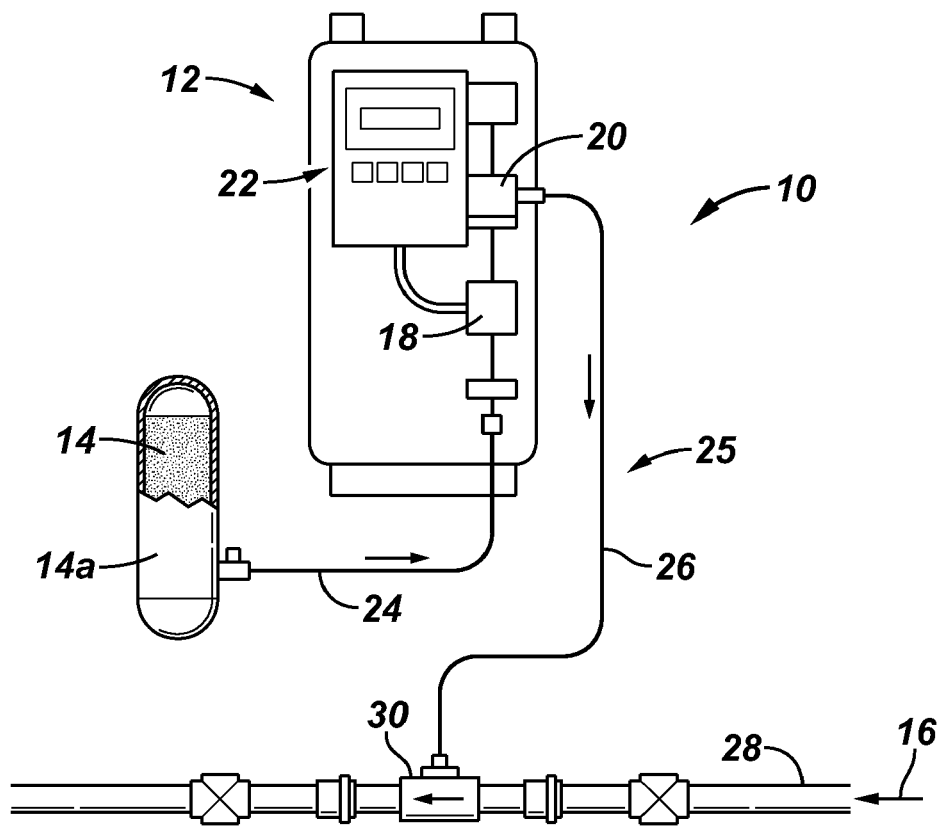
FIG. 1 is a schematic, elevation view of an illustrative embodiment of a chemical feeder system according to one or more aspects of the invention.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

According to one or more aspects of the disclosure a chemical feeder system for administering a desired concentration of a treating chemical to a flowing fluid stock comprises an aqueous chemical contained in a chemical source; a first ejector fluidicly connected with the flowing fluid stock; a second ejector fluidicly connected with the flowing fluid stock; a metering assembly comprising a flow rate sensor and a metering device interconnected to form a chemical flow path between a chemical inlet and a metered chemical outlet, the flow rate sensor positioned upstream of the metering device in the chemical flow path; a metered chemical conduit extending from the metering assembly to the first ejector and the second ejector; and an ejector switchover operationally connected within the metered chemical conduit to selectively route the flow of the aqueous chemical from the metered chemical conduit to one of the first ejector and the second ejector.

The system can include a controller operationally connected to the metering assembly, wherein the controller adjusts the flow rate of the aqueous chemical through the metering device in response to monitoring the flow rate sensor via the controller. The system can include a controller operationally connected to the metering assembly and the ejector switchover, wherein the controller actuates the ejector switchover changing the flow of the aqueous chemical into the flowing fluid stock through the first ejector to the second ejector. The controller may actuate the ejector switchover changing the flow of the aqueous chemical into the fluid stock from one ejector to another ejector in response to monitoring the flow rate sensor.

According to one or more aspects of the disclosure a chemical feeder system that is connectable within a fluid treatment system for applying a controlled flow rate of a treating chemical to a fluid stock comprises a metering assembly comprising a flow rate sensor and a metering device interconnected to form a chemical flow path between a chemical inlet and a metered chemical outlet, the flow rate sensor positioned upstream of the metering device in the chemical flow path; an ejector switchover manifold adapted to be fluidicly connected the metered chemical outlet of the metering assembly, wherein the ejector switchover manifold comprises at least one control valve adapted to split the chemical flow path from the metered chemical outlet into at least two metered ejector conduits; and a controller operationally connected to metering assembly and the ejector switchover, wherein the processor is adapted to actuate the ejector switchover to selectively open one of the at least two metered ejector conduits in response to monitoring the metering assembly via the controller. In at least one embodiment the controller is adapted to adjust the metering device in response to monitoring the flow rate sensor.

A method, according to one or more aspects of the disclosure, for continuously controlling the flow rate of an aqueous chemical drawn into a flowing fluid stock comprises providing a metering assembly comprising a flow rate sensor and a metering device forming a flow path between an inlet and a metered chemical outlet; drawing the aqueous chemical into the inlet of the metering assembly through the flow rate sensor and then the metering device and into the flowing fluid stock; monitoring the flow sensor; adjusting, via an electronic controller, the flow rate of the aqueous chemical through the metering device in response to monitoring the flow rate sensor; and directing, via the electronic controller, the flow of the aqueous chemical into the flowing fluid stock through one of a first ejector and a second ejector.

In at least one embodiment the monitoring the flow rate sensor and adjusting the flow rate are performed while drawing the aqueous chemical. According to one or more aspects of the invention, directing the flow of the aqueous chemical comprises switching the flow of the aqueous chemical in the flowing fluid stock through the first ejector to the second ejector.

FIG. 1 is a schematic, elevation view of an embodiment of a chemical feeder system, generally denoted by the numeral 10, according to one or more aspects of the invention. Depicted feeder system 10 includes a chemical feeder assembly 12 connected between a chemical 14 stored in a vessel 14a (together referred to herein as chemical 14 source) and a fluid stock 16. For purposes of illustration, fluid stock 16 is a waste water stream requiring chemical treatment. Chemical 14 may be any chemical that is required for treatment of fluid stock 16. Examples of chemicals 14 include, but are not limited to, aluminum sulfate, ammonia, ammonium phosphate, ammonium sulfate, aqua ammonia, copper sulfate, ferric chloride, ferrous chloride, ferrous sulfate, hydrochloric acid, polyphosphate, potassium permanganate, potassium sulfate, sodium bisulfate, sodium chlorate, sodium hexametaphosphate, sodium hydroxide, sodium hypochlorite, sulfuric acid, sulfuric and zinc orthophosphate.

Feeder assembly 12 comprises a flow rate sensor 18, metering device 20 and controller 22 for feeding chemical 14 at a desired rate (e.g., dose) to fluid stock 16. Controller 22 is operatively connected to metering device 20 and flow rate sensor 18 to maintain a desired feed rate of chemical 14 to fluid stock 16.

Feeder assembly 12 is connected to chemical 14 source by a chemical inlet conduit 24 and connected to fluid stock 16 through an outlet conduit 26 (e.g., metered chemical conduit). The fluid (e.g., chemical) flowing through metered chemical conduit 26 is downstream of the chemical metering (e.g., metering device 20) and flow rate measurement (e.g., flow rate sensor 18). Outlet conduit 26 is connected to a feed stock 16 conduit 28 via at least one ejector 30. A vacuum is created as fluid stock 16 flows through conduit 28 and ejector 30 drawing fluid (e.g., chemical 14) through conduits 24, 26 and feeder assembly 12. Feeder system 10 may further include various vacuum regulators, boosters or other devices as needed for the particular application without departing from the scope of the invention.

Figure 2B:
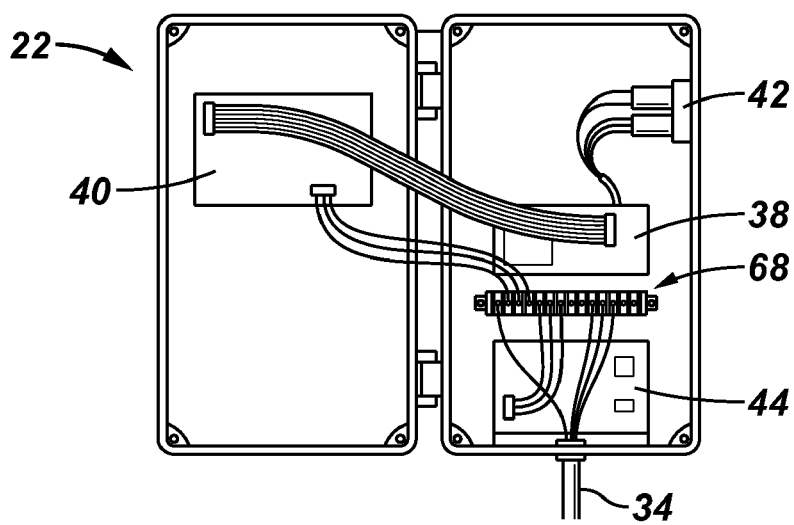
FIG. 2B is an expanded view of an embodiment of the chemical feeder assembly controller depicted in FIG. 2A.
Figure 2A:
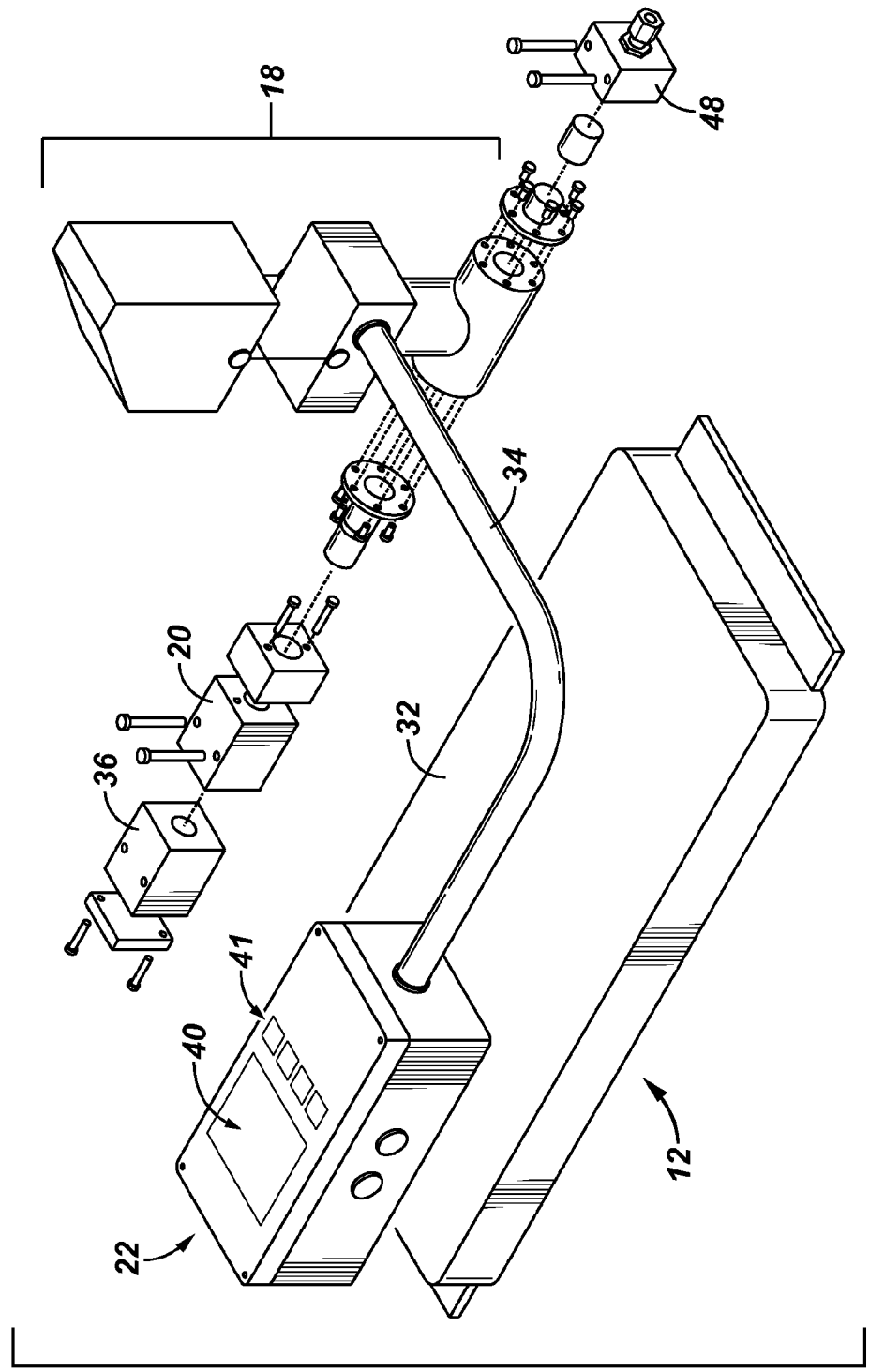
FIG. 2A is an exploded view of an illustrative embodiment of a chemical feeder assembly according to one or more aspects of the invention.

Refer now to FIG. 2A wherein an exploded view of an embodiment of a chemical feeder assembly 12 is provided. Feeder assembly 12 may be mounted on a panel 32 for convenience and ease of installation in a fluid treatment system. Controller 22 is operatively connected to flow rate sensor 18, for example via electrical lines 34. Depicted metering device 20 comprises a motor 36 (e.g., servo motor) to operate (e.g., actuate) metering device 20 and to adjust the control rate (e.g., dose) of chemical 14 to fluid stock 16 in response to signals from controller 22. Metering device 20 is connected to controller 22, for example, via connector 42 as illustrated in FIG. 2B. With reference back to FIG. 1 it is noted that flow rate sensor 18 is positioned upstream of metering device 20 in the chemical flow path 25 extending from chemical 14 source to fluid stock 16 (e.g., ejector 30). The portion of feeder assembly 12 extending between chemical inlet conduit 24 and outlet conduit 26 is referred to generally herein as a metering assembly 46 (see FIG. 3); the metering assembly comprises the chemical flow path extending through flow rate sensor 18 and metering device 20.

Flow rate sensor 18 is described in the depicted embodiments as a magnetic flow meter ("MFM") or a transit time flow meter (e.g., time of flight. Flow rate sensor 18 is depicted mounted in a vertical position relative to the ground; however, flow rate sensor 18 can be mounted in a horizontal plane relative to the ground according to one or more aspects of the present disclosure.

Flow rate sensor 18 measures (e.g., senses) the flow rate (e.g., treating chemical) passing through inlet conduit 24 and feeder assembly 12 and provides an electronic signal to controller 22 indicative of the chemical flow rate. With flow rate sensor 18 positioned upstream of metering device 20, controller 22 can accordingly control (e.g., actuate, adjust) metering device 20 in response to the actual flow rate of chemical 14 communicated from flow rate sensor 18 to achieve the desired chemical dose into outlet conduit 26 into fluid stock 16. According to one or more aspects of the disclosure, flow rate sensor 18 and controller 22 substantially continuously monitor the flow rate through feeder assembly 12.

Refer now to FIG. 2B wherein an expanded view of an embodiment of controller 22 is illustrated. Controller 22 includes at least one processor 38, comprising a visual display 40 and control panel 41. Control panel 41 comprises a keyboard, keypad, push buttons, touch screen or the like for inputting information into processor 38 and/or for setting the operational parameters of controller 22. Controller 22 (e.g., processor 38) is operatively connected to motor 36 of metering device 20 (FIG. 2B) via connector 42 for example. Processor 38 is connected to an appropriate power source 44, depicted as a battery (e.g., DC source) in this embodiment.

Figure 4:
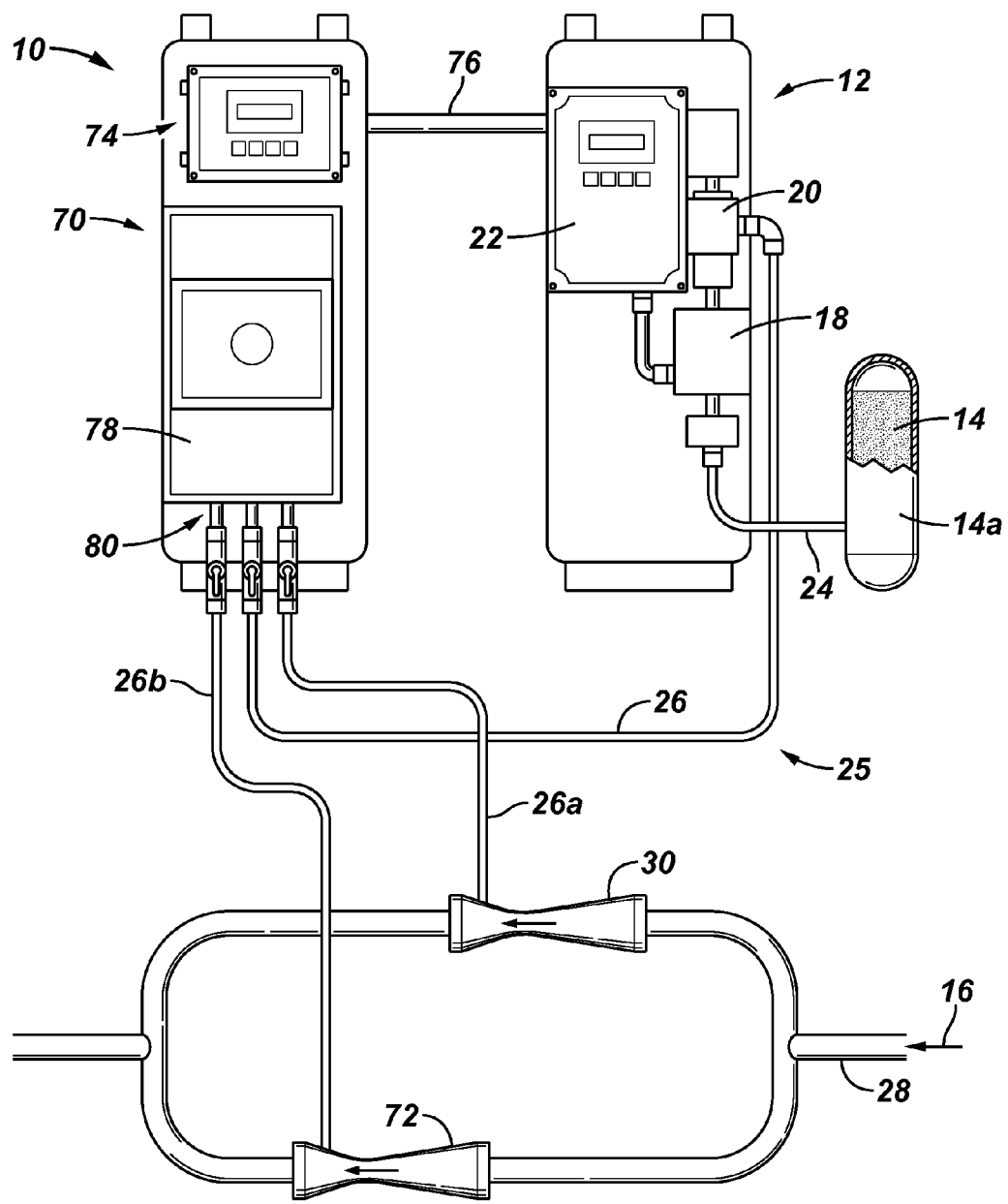
FIG. 4 is a schematic, elevation view of another embodiment of a chemical feeder system according to one or more aspects of the invention.
Figure 5:
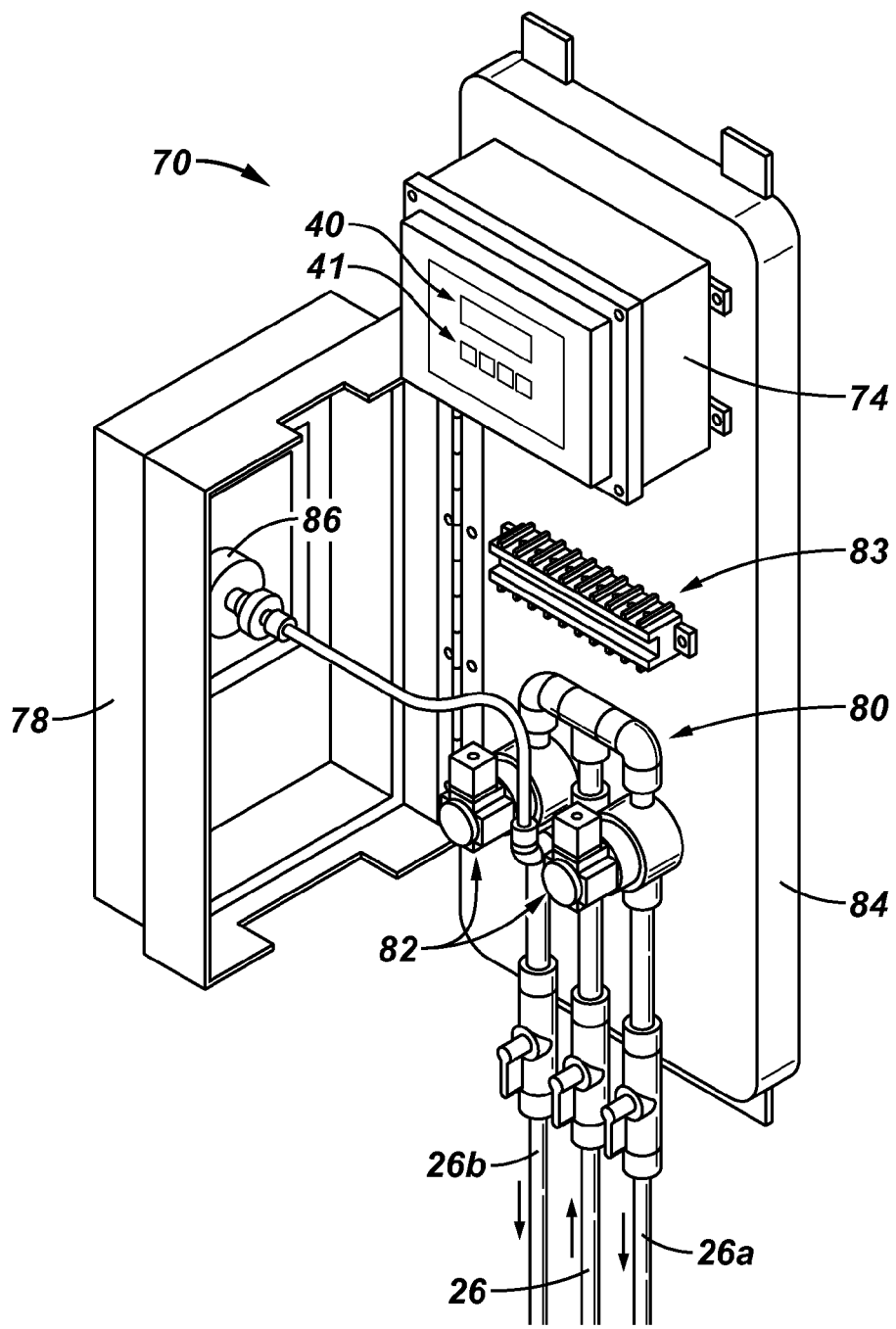
FIG. 5 is a schematic view of an embodiment of an ejector switchover according to one or more aspects of the invention.

Controller 22 further comprises an interface 68 (e.g., communication interface, power interface, electrical interface) for operationally connecting processor 38 to internal devices (e.g., power 44, display 40, motor 36, flow sensor 18) and external devices (e.g., ejector switchover 70, ejector switchover controller 74, control manifold 80, see FIGS. 4-5). Although interface 68 is depicted as a terminal for hardwiring physical electrical sources, it will be recognized by those skilled in the art with benefit of the disclosure that interface 68 can be adapted to provide communication between controller 22 and internal and/or external devices by other means such as, and without limitation to, optic fibers and radio frequency signals. In one example, processor 22 can transmit an alarm to a remote location via a physical and/or wireless phone connection.

Figure 3:
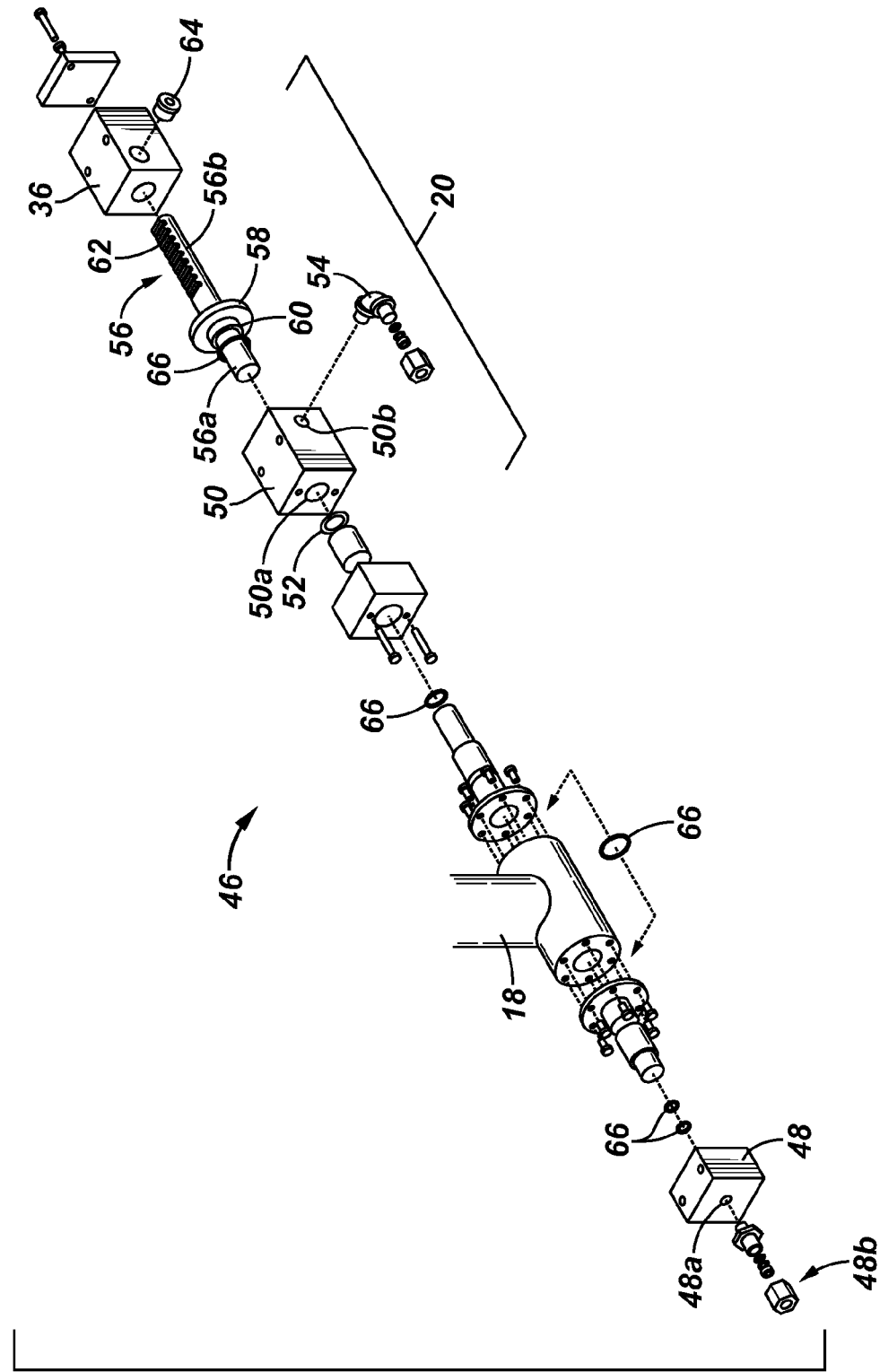
FIG. 3 is an exploded view of an embodiment of a metering assembly of the chemical feeder assembly according to one or more aspects of the invention.

FIG. 3 is an exploded view of an embodiment of metering assembly 46 according to one or more aspects of the invention described with reference to FIG. 1. Chemical inlet conduit 24 (FIG. 1) connects to metering assembly 46 via inlet connector 48b at inlet body 48 through inlet bore 48a. Flow rate sensor 18, having a bore 18a, is connected between inlet body 48 and metering device 20. Depicted metering device 20 is a V-notch type metering device having a body 50 defining an orifice 52 which may be formed of a material such as PTFE. Body 50 forms a bore 50a in fluid connection with bores 18a and 48a and a metered chemical discharge outlet 50b. A connector 54 is provided for connecting fluid outlet conduit 26 to metering assembly 46 through metered chemical discharge outlet 50b. Chemical flow path 25 extends from inlet 48a through discharge outlet 50b.

Depicted metering device 20 comprises a shaft 56 having a first end 56a functionally mated with body 50 and orifice 52 and a second end 56b functionally connected with motor 36. Shaft 56 is connected in a fluid sealed manner to body 50 such as by a clamping screw 58 having a collar seal 60 constructed of a suitable material such as TFE. Second end 56b of shaft 56 includes teeth 62 functionally connected to control shaft 64 of motor 36 in a manner such that second end 56a can be moved relative to orifice 52 controlling the flow of chemical 14 to fluid stock 16. The various elements may be interconnected with suitable means such as screws, bolts, flanges, and/or welding. Sealing members 66, such as O-rings and gaskets, suitable for use with chemical 14 may be included.

Operation of chemical feeder system 10 according to one or more aspects of the invention is now described with reference to FIGS. 1 through 3. Chemical feeder assembly 12 is connected via inlet conduit 24 and outlet conduit 26 between a fluid stock 16 to be treated and a treating chemical 14. Feeder assembly 12 is connected to a panel 32 that is oriented substantially vertical relative to ground level in the depicted embodiment. The desired chemical dose, or flow rate, is selected for fluid stock 16 to be treated and the dose is input into controller 22. Metering device 20 is actuated, for example via controller 22, to feed the desired chemical 14 dose utilizing the actual flow rate of the chemical 14 measured at flow rate sensor 18 and communicated to controller 22. It should be noted, in particular in relation to the initial operation of the system, that the chemical flow rate through metering device 20 may be set manually or via controller 22 (e.g., processor 38).

According to one or more aspects of the invention, system 10 is actuated by flowing fluid stock 16 through conduit 28 and ejector 30 creating a vacuum which draws chemical 14 from vessel 14a through chemical flow path 25. As chemical 14 is drawn through flow path 25 it passes through flow rate sensor 18. Flow rate sensor 18 monitors the chemical flow rate and sends an electronic signal to controller 22 indicative of the flow rate. Controller 22 can compare the communicated actual flow rate data with user inputted control instructions for correlation. If the actual flow rate measurement does not correlate with the user instructions, then controller 22 can actuate motor 36 and metering device 20 to adjust the chemical flow rate accordingly. As is well known in the art of electronic controllers, numerous user parameters or instructions may be input to dictate the operation of metering device 20.

FIG. 4 is a schematic, elevation view of another embodiment of chemical feeder system 10 according to one or more aspects of the invention. Chemical feeder system 10 comprises a chemical feeder assembly 12 and ejector switchover 70. Chemical feeder assembly 12 comprises a controller 22, metering device 20 and flow rate sensor 18 as described for example with reference to FIGS. 1-3 above. Ejector switchover 70 is connected within metered chemical outlet conduit 26 between chemical feeder assembly 12 and fluid stock 16 (e.g., ejector 30). The metered chemical dose (e.g., outlet conduit 26) is connected to fluid stock 16 via conduit 28 at more than one location as described in the embodiment of FIG. 1. In this embodiment, metered chemical conduit 26 is split into two metered chemical conduits 26a, 26b at ejector switchover 70. Metered chemical conduits 26a, 26b are also referred to from time to time herein as metered ejector conduits for the purpose of identifying the separate fluid flow paths from the primary chemical metered conduit 26. Each of the metered ejector conduits is connected to a respective ejector connected within fluid stock conduit 28. In this embodiment, metered ejector conduit 26a is connected to ejector 30, referred to herein as the primary ejector, and metered ejector conduit 26b is in fluid connection to ejector 72, referred to generally as the backup ejector. As will be understood by those skilled in the art with benefit of this disclosure, more than two ejectors may be utilized. For purposes of clarity, it is noted the chemical flow paths can be referred to as vacuum paths.

Ejector switchover 70 comprises a controller 74 (e.g., switchover controller, processor, circuit board) which is in operational communication with chemical feeder assembly 12 (e.g., controller 22, flow rate sensor 18, etc.) for example via communication link 76. Communication link 76 is depicted as a physical link (e.g., wire, optic fiber); however, a wireless communication link can be utilized. Switchover controller 74 and/or chemical feeder controller 22 is also in operational communication with a manifold, as described below with reference to FIG. 5, to select the flow of the metered chemical 14 through one and/or the other of metered ejector conduit 26a and metered ejector conduit 26b. As will be understood by those skilled in the art with benefit of this disclosure, operational features of feeder assembly controller 22 and switchover controller 74 can be combined and performed by one controller or split among more than two controllers without departing from the scope of the invention. The embodiment depicted in FIG. 4 is illustrative of an embodiment of a feeder system 10 in which ejector switchover 70 is provided as a stand alone unit adapted for connection with a chemical feeder assembly 12.

FIG. 5 is a schematic view of an ejector switchover 70 according to one or more aspects of the invention. In FIG. 5, a housing 78 is opened revealing a control manifold 80 where the flow path of the metered chemical is directed ton one of the systems ejectors. Depicted metered chemical conduit 26 from feeder assembly 12 is fluidicly connected with metered ejector conduit 26a (e.g., primary) and metered ejector conduit 26b (e.g., backup) at control manifold 80. In the depicted embodiment, a separate control valve 82 is connected in the flow path of each of primary metered ejector conduit 26a and metered ejector conduit 26b. Control valves 82 are depicted in this embodiment as electrically controlled solenoid valves which are operationally connected to switchover controller 74. In some embodiments a single control valve 82 can be utilized to control the flow path of the metered chemical through the metered ejector conduits. A vacuum gauge 86 is depicted in fluid communication with metered fluid conduit 26 upstream of conduits 26a, 26b. In this embodiment, vacuum gauge 86 is provided for a visual indicator of the vacuum being applied.

FIG. 5 depicts an interface 83 which may be utilized for operationally connecting one or more devices to ejector switchover 70, in particular controller 74. Wired connections (not shown) may be routed from interface 83 to controller 74 behind panel 84 for example. Interface 83 provides a means for operationally connecting an external power source (e.g., AC power) to controller 74 and/or control valves 82 as well as means of operationally connecting feeder assembly controller 22 to switchover ejector 70 via a wired connection 76 as depicted in FIG. 4. Non-limiting examples of devices that can be connected to controller 74 via interface 83 for example include external monitoring devices, alarms (e.g., visual, audio), and the like. In some embodiments, electrical power can be routed to or from feeder assembly 12.

An illustrative embodiment of a method of operating feeder system 10 is now described with reference to the preceding figures. A chemical 14 is selectively applied through one or more ejectors to fluid stock 16 in a controlled metered amount via a feeder assembly 12. According to one or more aspects of the invention, system 10 can switch the application of the metered chemical from one ejector to another ejector in response to monitoring the chemical flow path at feeder assembly 12. For example, a signal may be communicated to switch the metered chemical flow from a primary ejector 30 to a backup ejector 72 in response to a measurement obtained at feeder assembly 12. In one example, a measurement at flow rate sensor 18 indicting a disruption (e.g., drop in flow rate, loss of vacuum, etc.) in the active metered ejector conduit 26a or metered ejector conduit 26b actuates control manifold 80 (e.g., one or more control valves 82) to switch the metered chemical flow path from one of conduit 26a or 26b to the other one of conduit 26a or 26b and the respective ejector 30, 72.

Chemical feeder assembly 12 is connected via inlet chemical conduit 24 to treating chemical 14 wherein the chemical 14 is drawn through metering assembly 46. The metered chemical 14 flow continues to flow through a metered ejector conduit to an ejector 30, 72 in fluid communication with the flowing fluid stock 16 (e.g., in conduit 28). The vacuum created at the utilized ejector is applied through the metered fluid conduit. An ejector switchover 70 comprising at least a control manifold 80 is connected in the metered chemical conduit 26 downstream of metering assembly 46. Control manifold 80 connects metered chemical conduit 26 to at least two ejectors 30, 72 fluidicly connected to flowing fluid stock 16. At least one controller, for example feeder assembly controller 22 or ejector switchover controller 74 is operationally connected between metering assembly 46 and control manifold 80. In response to an event monitored at metering assembly 46, the at least one controller 22, 74 causes the metered chemical 14 flow to be switched from one ejector 30, 72 to the other ejector.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A chemical feeder system for administering a desired concentration of a treating chemical to a flowing fluid stock, the system comprising:
   a first ejector fluidicly connected with the flowing fluid stock;
   a second ejector fluidicly connected with the flowing fluid stock;
   a metering assembly comprising a flow rate sensor and a metering device interconnected to form a chemical flow path between a chemical inlet and a metered chemical outlet, the flow rate sensor positioned upstream of the metering device in the chemical flow path;
   an aqueous chemical in fluid connection with the chemical flow path through the chemical inlet;
   a metered chemical conduit extending from the metering assembly to the first ejector and the second ejector; and
   an ejector switchover operationally connected within the metered chemical conduit to selectively route the flow of the aqueous chemical from the metered chemical conduit to one of the first ejector and the second ejector.

2. The system of claim 1, further comprising a controller operationally connected to the metering assembly, wherein the controller adjusts the flow rate of the aqueous chemical through the metering device in response to monitoring the flow rate sensor via the controller.

3. The system of claim 1, further comprising a controller operationally connected to the metering assembly and the ejector switchover, wherein the controller actuates the ejector switchover changing the flow of the aqueous chemical into the flowing fluid stock through the first ejector to the second ejector.

4. The system of claim 1, further comprising a controller operationally connected to the metering assembly and the ejector switchover, wherein the controller actuates the ejector switchover changing the flow of the aqueous chemical into the flowing fluid stock through the first ejector to the second ejector in response to monitoring the flow rate sensor via the controller.

5. The system of claim 1, wherein the metering device comprises a shaft having a collar seal disposed at a first end and a second end connected to a motor, the shaft moveably disposed with an orifice.

6. The system of claim 5, further comprising a controller operationally connected to the flow rate sensor and the metering device, wherein the controller adjusts the flow rate of the aqueous chemical through the metering device in response to monitoring the flow rate sensor via the controller.

7. The system of claim 6, wherein the controller is operationally connected to the ejector switchover, wherein the controller actuates the ejector switchover changing the flow of the aqueous chemical into the flowing fluid stock through the first ejector to the second ejector.

8. The system of claim 5, further comprising a controller operationally connected to the metering assembly and the ejector switchover, wherein the controller actuates the ejector switchover changing the flow of the aqueous chemical into the flowing fluid stock through the first ejector to the second ejector in response to monitoring the flow rate sensor via the controller.

9. The system of claim 1, wherein the flow rate sensor comprises a magnetic flow meter.

10. The system of claim 4, wherein the metering device comprises a shaft having a collar seal disposed at a first end and a second end connected to a motor, the shaft moveably disposed with an orifice.

11. A chemical feeder system that is connectable within a fluid treatment system for applying a controlled flow rate of a treating chemical to a fluid stock, the system comprising:
    a metering assembly comprising a flow rate sensor and a metering device interconnected to form a chemical flow path between a chemical inlet and a metered chemical outlet, the flow rate sensor positioned upstream of the metering device in the chemical flow path;
    an ejector switchover manifold adapted to be fluidically connected the metered chemical outlet of the metering assembly, wherein the ejector switchover manifold comprises at least one control valve adapted to split the chemical flow path from the metered chemical outlet into at least two metered ejector conduits; and
    a controller operationally connected to the metering assembly and the ejector switchover, wherein the controller is adapted to actuate the ejector switchover to selectively open one of the at least two metered ejector conduits in response to monitoring the metering assembly via the controller.

12. The system of claim 11, wherein the controller is adapted to adjust the metering device in response to monitoring the flow rate sensor.

13. The system of claim 12, wherein the metering device comprises a shaft having a collar seal disposed at a first end and a second end connected to a motor, the shaft moveably disposed with an orifice.

14. The system of claim 13, wherein the controller is adapted to adjust the metering device in response to monitoring the flow rate sensor.

15. A method for continuously controlling the flow rate of an aqueous chemical drawn into a flowing fluid stock, comprising:
    using a metering assembly comprising a flow rate sensor and a metering device forming a flow path between an inlet and a metered chemical outlet;
    drawing the aqueous chemical into the inlet of the metering assembly through the flow rate sensor and then the metering device and into the flowing fluid stock;
    monitoring the flow sensor;
    adjusting, via an electronic controller, the flow rate of the aqueous chemical through the metering device in response to monitoring the flow rate sensor; and
    directing, via the electronic controller, the flow of the aqueous chemical into the flowing fluid stock through one of a first ejector and a second ejector.

16. The method of claim 15, wherein monitoring the flow rate sensor and adjusting the flow rate are performed while drawing the aqueous chemical.

17. The method of claim 15, wherein the metering device comprises a shaft functionally connected between a motor and an orifice.

18. The method of claim 15, wherein directing the flow of the aqueous chemical comprises switching the flow of the aqueous chemical in the flowing fluid stock through the first ejector to the second ejector.

19. The method of claim 18, wherein monitoring the flow rate sensor and adjusting the flow rate are performed while drawing the aqueous chemical.

20. The method of claim 19, wherein the metering device comprises a shaft functionally connected between a motor and an orifice.

* * * * *